April 21, 1942.  A. J. GRINDLE  2,280,394
PULVERIZED FUEL STORING AND FEEDING APPARATUS
Filed Sept. 22, 1938  3 Sheets-Sheet 1
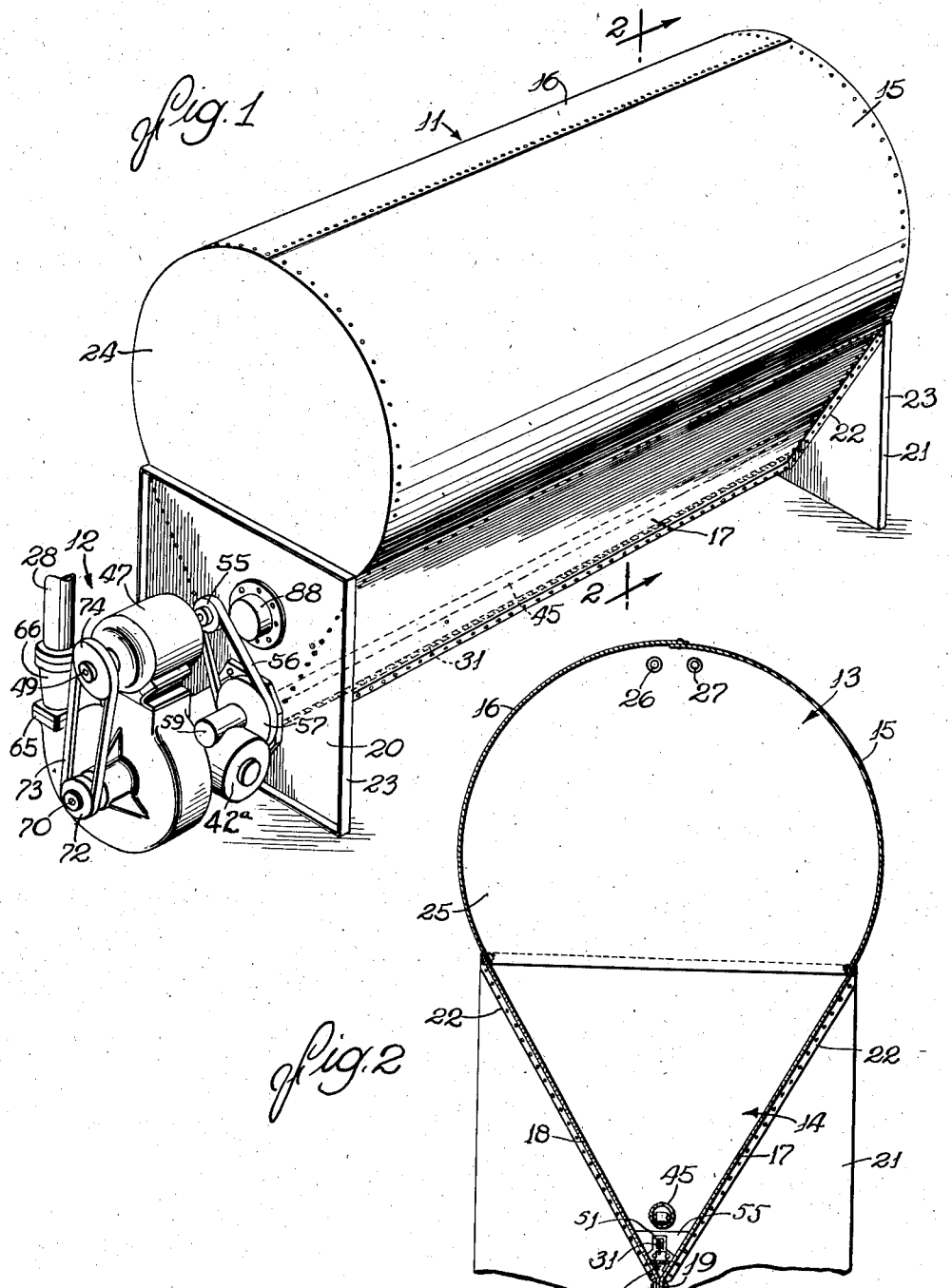

April 21, 1942.　　　　A. J. GRINDLE　　　　2,280,394
PULVERIZED FUEL STORING AND FEEDING APPARATUS
Filed Sept. 22, 1938　　　3 Sheets-Sheet 2

INVENTOR
Aubrey J. Grindle
By Parker, Carlson, Pitzner & Hubbard
ATTORNEYS

April 21, 1942. A. J. GRINDLE 2,280,394
PULVERIZED FUEL STORING AND FEEDING APPARATUS
Filed Sept. 22, 1938 3 Sheets-Sheet 3
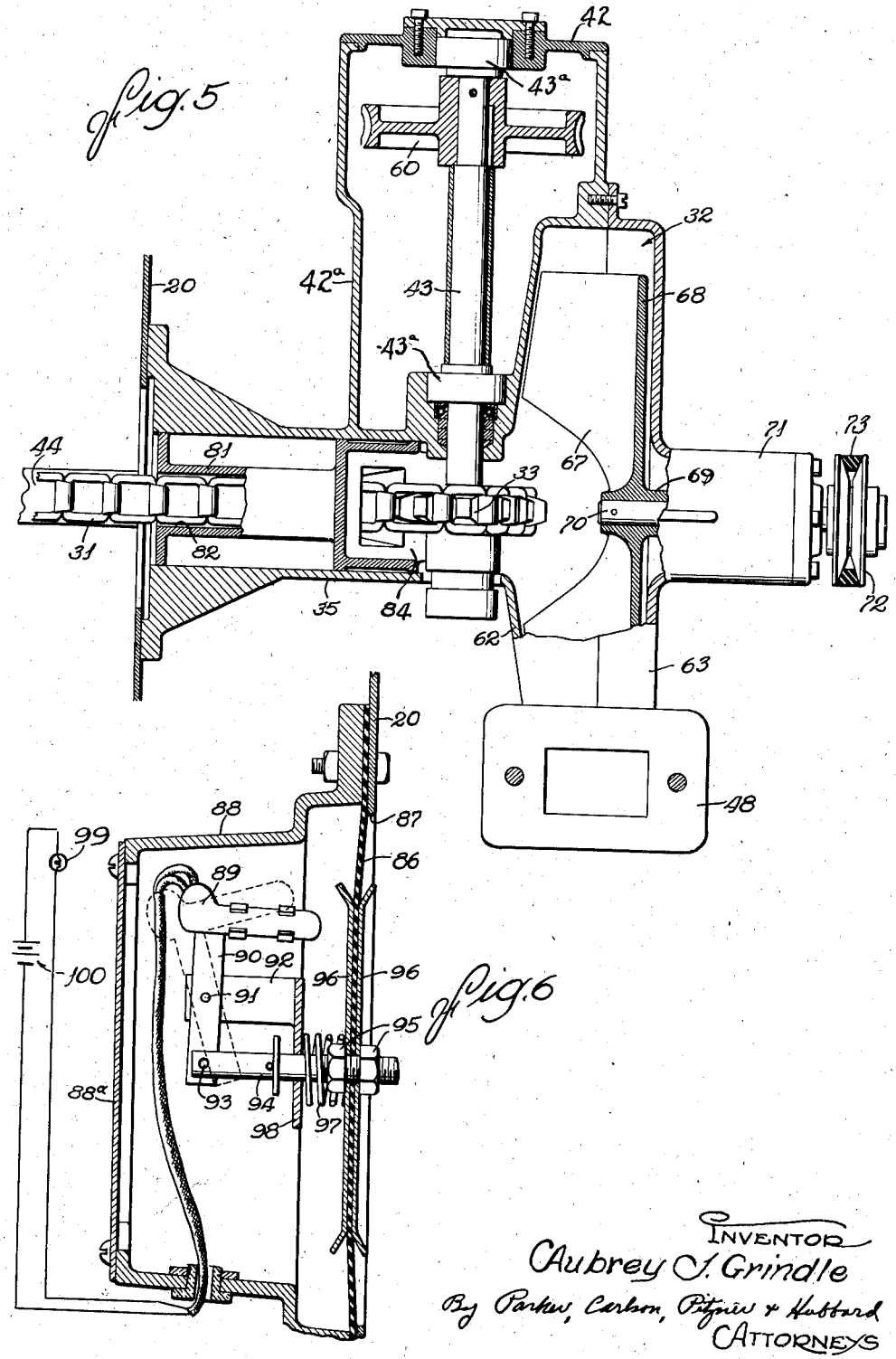

Patented Apr. 21, 1942

2,280,394

UNITED STATES PATENT OFFICE 2,280,394

PULVERIZED FUEL STORING AND FEEDING APPARATUS

Aubrey J. Grindle, Chicago, Ill.

Application September 22, 1938, Serial No. 231,238

4 Claims. (Cl. 302—11)

The invention relates to improvements in apparatus for storing and feeding finely pulverized fuel and is concerned more particularly with apparatus of this general character adapted for use with domestic heating systems or other relatively small heating installations.

One object of the invention is to provide an improved pulverized fuel feeder of sturdy and foolproof construction which is capable of operating for long periods of time without attention.

A more specific object is to provide an improved pulverized fuel feeder comprising a novel mechanical conveyer for transferring fuel from a hopper to a fuel delivery blower adapted to mix the fuel with primary air and deliver the mixture under pressure to the burner and including novel means for driving the conveyer and blower at independently adjustable speeds for regulating both the proportion of fuel and air in the mixture and the quantity of the mixture supplied to a burner.

Another object is to provide a pulverized fuel feeder including a conveyer and blower associated in a novel manner so as to facilitate the removal of all fuel particles from the conveyer and their proper entrainment with primary air.

Another object is to provide a fuel storage hopper of novel and improved construction which is capable of holding a relatively large amount of finely pulverized fuel in a manner such that the fuel may be readily withdrawn for use.

Still another object is to provide improved fuel storing and feeding apparatus including a fuel hopper and a conveyer together with means for preventing the conveyer from being clogged with accumulations of the fuel.

It is also an object of the invention to provide an improved fuel level indicator for use with pulverized fuel storage apparatus.

Other objects and advantages of the invention will become apparent from the detailed description of the preferred embodiment illustrated in the accompanying drawings, in which:

Figure 1 is a perspective view of a pulverized fuel storing and feeding apparatus embodying the features of the invention.

Fig. 2 is a transverse sectional view of the fuel hopper taken along the line 2—2 of Fig. 1.

Fig. 5 is a horizontal sectional view of the feed apparatus.

Fig. 6 is a sectional view of the fuel level indicator.

Figures 3, 4:
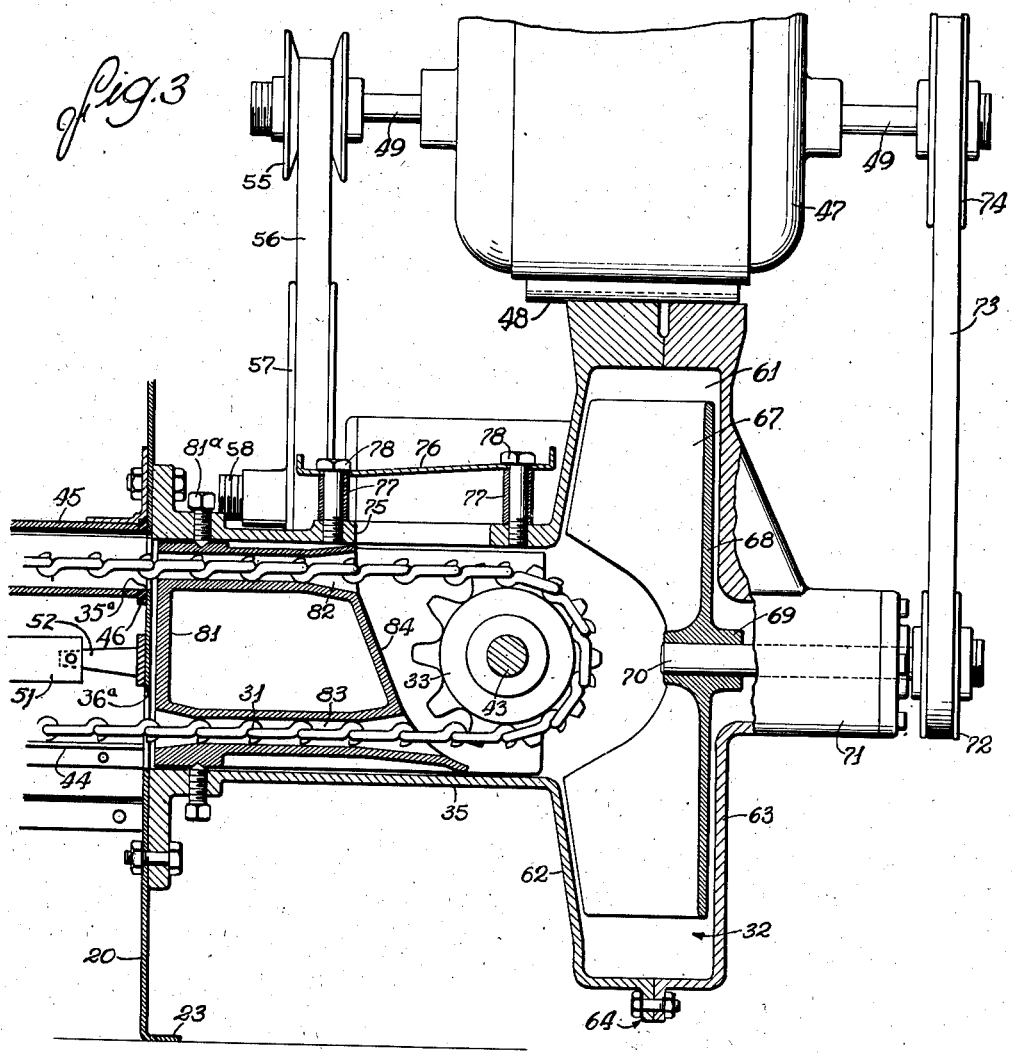
Fig. 3 is a vertical sectional view of the feed mechanism showing the delivery end of the conveyer and its relationship to the blower and other elements of the mechanism.
Fig. 4 is a vertical sectional view of the rear support and housing for the conveyer.

Referring more particularly to Fig. 1 of the drawings, the improved fuel storing and feeding apparatus comprises generally a hopper 11 for storing finely pulverized fuel and a feed mechanism 12 for withdrawing the fuel from the hopper, mixing it with primary air and delivering the mixture under pressure to a pulverized fuel burner. The various mechanisms constituting the apparatus are assembled in a compact unitary structure, as shown in Fig. 1, adapted to be placed at a convenient point near the burner.

The hopper 11, which is preferably fabricated from sheet metal, is designed with a particular view of holding a relatively large supply of pulverized fuel in a limited space and in a manner such that the fuel may be readily withdrawn for use. To this end, the hopper is constructed in the form of an elongated tank having a generally semi-cylindrical, horizontally disposed body portion 13 the sides of which converge into a base portion 14 of generally V-shaped transverse cross section.

In the exemplary embodiment shown in Figs. 1 and 2, the body portion 13 of the hopper is formed by arcuately bent plates 15 and 16 riveted or otherwise secured together along their upper edges. The lower edges of the plates 15 and 16 are bolted respectively to converging flat plates 17 and 18 which in turn are bolted together as at 19. The plates 17 and 18 constitute the side walls of the base portion 14 and their inclination is such that the finely pulverized fuel tends to slide down into the bottom of the V-shaped base without clogging.

The hopper is supported at opposite ends by standards in the form of rectangular metal plates 20 and 21 bolted or otherwise secured to laterally projecting flanges 22 on the ends of the side plates 17 and 18. Marginal flanges 23 are formed on the plates 20 and 21 to make them sufficiently rigid to support the weight of the hopper and fuel without buckling. The plates 20 and 21, in addition to supporting the hopper, also serve as end walls for the base section 14. The top section 13 of the hopper is closed by separate end walls comprising headers 24 and 25 secured to the curved plates 15 and 16.

In domestic heating installations, the hopper 11 is preferably filled from a tank truck or the like by means of a pneumatic conveyer. For this purpose, the rear header 25 is provided with an inlet port 26 equipped with a suitable fitting for connection to the conveyer pipe. A port 27 provides an outlet for the air employed in conveying the fuel to the hopper. The outlet port may be vented to the atmosphere and will ordinarily be equipped with a suitable screen or baffle to prevent loss of pulverized fuel during the filling operation.

The feed mechanism 12 comprises means for withdrawing the pulverized fuel from the hopper 11 and means for mixing the fuel with primary air and for discharging the mixture under pressure into a fuel delivery duct 28 leading to a pulverized fuel burner which may be of any suitable and well known type. The means for withdrawing the fuel from the hopper preferably comprises a mechanical conveyer, herein shown as an endless flexible chain 31 (Figs. 3 and 4), running through the base portion 14 of the hopper. The links of the chain are shaped so as to pick up and retain a quantity of the fuel as the chain is moved through the hopper. One run of the chain, preferably the lower run, is disposed in direct contact with the fuel to enable it to carry a quantity of the fuel to the fuel mixing and delivery means which, as herein shown, comprises a blower 32.

As shown in Figs. 3 and 4, the chain 31 is arranged to run over a driving sprocket 33 at the front end of the hopper 11 and over a tail sprocket 34 at the rear end of the hopper. The sprockets are enclosed in and supported by housings 35 and 36 removably secured to the standards 20 and 21 respectively externally of the hopper. The standards are apertured as at 35ᵃ and 36ᵃ to provide passages respectively for the upper and lower runs of the chain within the area enclosed by the housings.

Referring more particularly to Fig. 4, the tail sprocket 34 is journaled on a shaft 37 carried on an adjustable block 38 slidably supported on one side of the housing 36 by bolts 40 operating in elongated slots 41 extending longitudinally of the block. The shaft 37 is arranged to project into the housing through an aperture 38ᵃ in the wall thereof so as to aline the tail sprocket with the apertures 35ᵃ and 36ᵃ in the end plate 21 of the hopper. An adjusting screw 39 extending through an apertured lug 39ᵃ projecting laterally from the housing is threaded into an outwardly projecting flange 40ᵃ on the sprocket supporting block 38 and provides means for moving the entire sprocket assembly toward and from the hopper to adjust the tension of the chain 31. After adjustment, the block may be locked in place by tightening the locking bolts 40.

Referring now to Figs. 3 and 5, the driving sprocket 33 is keyed to a drive shaft 43 journaled in antifriction bearings 43ᵃ carried respectively on a side wall of the housing 35 and on the end wall 42 of a gear casing 42ᵃ formed integrally with the housing 35. The end wall 42 is preferably removably secured to the casing to provide convenient access to the enclosed mechanism.

The drive shaft 43 is positioned so that the sprocket 33 is alined with the apertures 35ᵃ and 36ᵃ in the end wall 20 of the hopper and the lower or "operative" run of the chain 31 is caused to travel on a wear plate 44 extending longitudinally of the hopper at the bottom of the V-shaped base portion. The upper run of the chain, which may be termed the "return" run, is spaced substantially above the lower run. In order to prevent the return run from carrying fuel back into the tail sprocket housing, the run is enclosed in a tubular casing 45 extending between the apertures 35ᵃ in the end walls of the hopper. Gaskets 46 interposed between the ends of the casing and the walls of the hopper provide a tight seal between the same to prevent leakage of fuel into the casing.

The lower run of the chain 31 is in direct contact with the fuel and is therefore effective to carry a portion of the fuel along in its movement into the casing 35. Feed movement is imparted to the chain through the driving sprocket 33 and the shaft 43 by a motor 47 carried on a bracket 48 formed integrally with the casing 35. The motor 47 is preferably of the double drive shaft type, that is, it is provided with a drive shaft 49 adapted to carry a driving pulley on each end. Mounted on the inner end of the drive shaft 49 is an adjustable speed pulley 55 drivingly connected by a V-belt 56 with an adjustable pulley 57 fast on a worm shaft 58. The shaft 58 is journaled in a bearing 59 formed integrally with the casing 42ᵃ and carries a worm (not shown) meshing with a worm wheel 60 fast on the chain drive shaft 43. Due to the provision of the adjustable V-belt pulleys, the travel of the chain 31 can be adjusted as required to regulate the amount of fuel delivered at the casing 35 in a given period.

A suitable agitator may be provided to prevent packing or bridging of the fuel in the hopper. As herein shown, the agitator comprises an elongated flat bar 51 extending longitudinally through the base of the hopper between the upper and lower runs of the conveyer chain. The bar 51 is disposed in edgewise position and pivoted at its forward end on a bracket 52 secured to the end plate 20. The rear end of the bar terminates in a horizontal web 53 which carries a rounded chain engaging member 54 adapted to lie on the chain 31.

Due to the engagement of the member 54 with the chain 31, movement of the chain is effective to oscillate the agitator bar 51 on its pivot. The bar thus acts to loosen the surrounding body of fuel so that it can be picked up by the chain. A guide plate 55 slotted to receive the agitator bar 51 extends transversely across the hopper adjacent the rear end thereof to hold the bar in operative relation to the conveyer chain.

The fuel carried by the conveyer is delivered to the blower 32 which is enclosed in a cylindrical chamber 61 formed by a flanged circular wall 62 cast integrally with the housing 35 at the front end thereof. The chamber is closed at its front end by a removable flanged end plate 63 bolted to a flange on the wall 62 as indicated at 64. The chamber thus formed has a central opening communicating with the interior of the housing 35. A portion of the periphery of the sprocket 33 projects through the opening and into the chamber thus holding the end of the conveyer chain within the blower chamber. The chamber 61 is also formed with a peripheral outlet 65 to which the fuel delivery pipe 28 is connected by a suitable coupling 66.

Mounted within the chamber 61 is a blower comprising an impeller formed by radially extending peripherally spaced vanes 67 projecting rearwardly from the face of a circular disk 68. The disk is formed with a central hub 69 keyed to a shaft 70 journaled in a bearing 71 formed on the front end plate 63. The impeller is driven by means of an adjustable speed pulley 72 fast on the shaft 70 connected by a belt 73 with an adjustable speed pulley 74 fast on the motor shaft 49. The speed of the impeller and thus the quantity of air and fuel mixture supplied to the fuel delivery pipe 28 can thus be regulated independently of the conveyer to insure delivery of the required quantity of fuel and air mixture to the burner.

The conveyer and blower are so related that all of the fuel carried by the conveyer is received by the blower and entrained in the primary air to form a uniform mixture. To this end, the conveyer is arranged to discharge its fuel load centrally of the impeller and within the plane defined by the outer radial edges of the vanes 67. This result is attained by positioning the sprocket wheel with a portion of its periphery extending into the blower chamber as hereinbefore explained and by tapering the vanes 67 adjacent the axis of the impeller so as to form a cup-shaped depression for the reception of the sprocket 33 and chain 31.

The blower is also arranged to draw the primary air over the conveyer chain in a manner such that a scrubbing action is exerted on both sides of the chain links. To this end, the housing 35 is provided with a suction inlet 75 in its upper wall, the inlet being located above and slightly to the rear of the driving sprocket 33. Thus, an air stream is drawn over the upper run of the chain and then over the lower run of the chain so that both sides of the chain links are scoured clean of fuel. The air stream also acts on the driving sprocket to keep the sprocket teeth clear of fuel and thus prevent jamming of the feed apparatus. A guard in the form of a drip pan 76 mounted above the inlet 75 and spaced therefrom by suitable sleeves 77 encircling mounting bolts 78 protects the opening from the entrance of grease from the motor or from other foreign substances which might clog the feed mechanism.

Withdrawal of fuel from the hopper by the blower alone is prevented by a suitable guard member enclosed in the housing 35 between the feed sprocket 33 and the fuel hopper. As herein shown, the guard member is in the form of a casting 81 designed to fit snugly into the housing 35 and to be removably held in place therein by set screws 81ᵃ. Extending longitudinally of the member are upper and lower ducts 82 and 83 for the passage of the conveyer chain. The ducts are dimensioned to receive the chain links with a snug fit so that relatively little leakage of air takes place. The duct 83, through which fuel from the hopper is delivered to the blower, is tapered at its rear end to prevent accidental engagement of the chain links with the sides of the member 81 and at its forward end so that the fuel may fall freely from the chain and be drawn into the blower. The member 81 further acts to direct the incoming air stream into the blower and to this end the front wall is inclined as indicated at 84.

In order to guard against stoppage of the burner through exhaustion of fuel, means is provided for operating a suitable signal upon the fuel level in the hopper falling below a predetermined point. The fuel level indicator, as herein shown, comprises a flexible diaphragm 86 of leather or other suitable material secured over an aperture 87 in the end wall 20 of the hopper. The diaphragm is held in place by means of a flanged casing 88 bolted or otherwise removably secured to the end wall 20. The casing is closed by a cover plate 88ᵃ to form a closed dust-proof enclosure for the switch mechanism of the indicator.

Mounted within the casing 88 is an electrical switch 89 adapted to be operated between open and closed positions through movements of the diaphragm 86. As herein shown, the switch 89 is mounted on the upper end of a switch member 90 supported intermediate its ends on a pivot or pin 91 carried on a bracket 92 projecting from the inner wall of the casing. The lower end of the member 90 is pivotally connected by a pin 93 with a slidable rod 94 which extends through the diaphragm 86 and is clamped thereto by means of nuts 95 threaded on the end of the rod. A metal disk 96 is interposed between each nut and the diaphragm 86 to strengthen the diaphragm and prevent excessive deformation of the same.

The diaphragm is normally held in a substantially vertical position by means of a coiled compression spring 97 interposed between the outer disk 96 and a flange 98 of the bracket 92. When the hopper is filled above the level of the diaphragm 86, the fuel presses the diaphragm outwardly and, through the rod 94, rocks the switch 89 to the open position shown in full lines in Fig. 6. As the fuel is withdrawn from the hopper, pressure is removed from the diaphragm and the spring 97 acts to rock the switch to the circuit closing position shown in dotted line. By way of illustration, the switch 89 is shown connected in series with a signal lamp 99 and battery or other suitable source of current 100. Closure of the switch is therefore effective to operate the signal lamp and thus provide an indication of the impending shortage of fuel. Upon refilling the tank, the diaphragm 86 is again forced outwardly to open the switch and extinguish the lamp.

It will be apparent from the foregoing that the invention provides a storing and feeding apparatus for finely pulverized fuel which is of simple and sturdy construction and which is capable of operating for long periods of time without adjustment or expert attention. The hopper is constructed to hold a relatively large supply of fuel in a manner such that the fuel can readily be withdrawn for use. The feed mechanism is assembled with the hopper to form a unitary structure and includes a novel conveyer for withdrawing the fuel from the hopper and delivering it to a blower which mixes the fuel with primary air and supplies the mixture under pressure to the burner. The conveyer and blower are so related that fuel particles are all removed from the conveyer, thus preventing clogging of the conveyer or associated drive mechanism. Moreover, the return run of the chain is enclosed so that direct contact with the fuel is prevented, thereby avoiding any possibility of carrying fuel back into the housing enclosing the tail sprocket which supports the rear end of the conveyer.

The invention also provides a fuel level indicator of novel construction arranged to operate a suitable signal when the pulverized fuel in the hopper falls below a predetermined point, thus effectually guarding against shut-down of the burner due to exhaustion of the fuel supply.

I claim as my invention:

1. In a pulverized fuel storing and feeding apparatus including a fuel hopper, a feeding mechanism comprising, in combination, a housing mounted at one end of the hopper, a blower enclosed in said housing, an endless chain conveyer running through said hopper and into said housing for carrying fuel from the hopper to said blower, and guard means mounted in said housing to prevent withdrawal of fuel from the hopper by said blower, said guard means comprising a member adapted to close one end of the housing and formed to provide two longitudinally extending ducts for the passage of the conveyer chain between the hopper and the housing.

2. In a pulverized fuel storing and feeding apparatus including a fuel hopper, a feeding mechanism comprising, in combination, a housing mounted at one end of the hopper, a blower enclosed in said housing, an endless chain conveyer running through said hopper and into said housing for carrying fuel from the hopper to the end of the housing adjacent said blower, a suction inlet in said housing for supplying air to said blower, and a guard member disposed in the other end of said housing to prevent the blower from drawing fuel from the hopper, said member having a pair of ducts providing passages for opposite runs of the conveyer chain between the hopper and the blower end of said housing.

3. In a pulverized fuel storing and feeding apparatus including a fuel hopper, a feeding mechanism comprising, in combination, a housing mounted at one end of the hopper, a blower enclosed in said housing, an endless chain conveyer running through said hopper and into said housing for carrying fuel from the hopper to the end of the housing adjacent said blower, a suction inlet in said housing for supplying air to said blower, a guard member positioned to block the other end of the housing, said member having a pair of ducts arranged to provide passages for opposite runs of the conveyer chain, and an air deflecting member formed integrally with said guard member for directing the air drawn through said inlet over the fuel carried into the housing by said conveyer and then into said blower.

4. The combination with an elongated horizontally disposed pulverized fuel hopper, of a unitary fuel feeding apparatus including a housing rigidly secured to one end of the hopper, said housing defining an elongated horizontal chamber communicating at one end with the hopper and opening at the other end into a generally cylindrical chamber of substantially greater diameter than said first chamber, said cylindrical chamber having a peripheral outlet adapted to be connected with a fuel delivery pipe, an impeller journaled on the housing and disposed coaxially within said cylindrical chamber for rotation about a horizontal axis, a sprocket wheel journaled on the housing and disposed in said first chamber for rotation about a horizontal axis substantially perpendicular to the axis of said impeller, an endless chain conveyer running through the hopper and over said sprocket wheel for carrying fuel from the hopper to the impeller chamber, a motor mounted on said housing, and separate power take off means from said motor for said impeller and said sprocket wheel.

AUBREY J. GRINDLE.